United States Patent [19]
Weinhold

[11] 3,910,312

[45] Oct. 7, 1975

[54] COUPLING FOR PRESSURE CONDUITS

[76] Inventor: Karl Weinhold, Im Jagdfeld 43, D-404 Neuss, Germany

[22] Filed: Apr. 22, 1974

[21] Appl. No.: 463,035

[52] U.S. Cl. .......................................... 137/614.03
[51] Int. Cl.² ......................................... F16L 37/00
[58] Field of Search.......... 137/614, 614.01, 614.02, 137/614.03, 614.04, 614.05, 539.5; 285/305, 314, 315, 316; 251/149.7

[56] References Cited
UNITED STATES PATENTS
| | | | |
|---|---|---|---|
| 3,127,845 | 4/1964 | Voelcker | 137/539.5 X |
| 3,450,424 | 6/1969 | Calisher | 137/614.03 X |

FOREIGN PATENTS OR APPLICATIONS
| | | | |
|---|---|---|---|
| 1,810,282 | 6/1970 | Germany | 137/614.04 |
| 587,519 | 9/1953 | Canada | 137/614.03 |
| 1,266,400 | 9/1960 | France | 137/614.03 |

Primary Examiner—Martin P. Schwadron
Assistant Examiner—Robert J. Miller
Attorney, Agent, or Firm—Sherman & Shalloway

[57] ABSTRACT

A coupling for pressure-conduits including coupling members having pressure-locking valves to avoid pressure-or fluid-loss on being disconnected, a sleeve for sealing between the two coupling members when they are partly assembled and a separate pressure equalizing valve for transferring to or equalizing pressure within the sealed area of the sleeve immediately prior to final assembly and locking of the coupling.

9 Claims, 5 Drawing Figures

3,910,312

COUPLING FOR PRESSURE CONDUITS

BACKGROUND OF THE INVENTION

Prior quick-connect couplings for conduits containing fluids under pressure and including pressure-lock valves are known in the prior art. The pressure-lock valves in the coupling members retain the pressure and the contents of the fluid in their respective conduits, while they are disconnected, and permit flow only when they are assembled as a coupling, during which the valves typically exert an opening force on each other as they are forced together into their coupled state.

However, in many cases, such couplings require extreme force or exertion to overcome the internal pressure loading of the conduit, which acts as a direct force opposing the mechanical opening of the pressure-lock valves.

Attempts have been made to alleviate this problem by prepressuring or pressure-equalizing the zone between the adjacent pressure-locks as they are in the act of being assembled. This has included the use of two-stage poppet valves in a connecting member, with one of the valve stages providing for only a restricted, pressurizing flow.

However, such multiple-poppets are difficult and costly to manufacture and are not entirely reliable. Also, they are sensitive to slight misalignment or wear and are therefore susceptible to skewing and jamming in service.

In particular, such valves require considerable machining, close tolerances and careful heat treatment to provide the necessary surface-hardness of wearing or bearing areas and of the valving surfaces.

A special disadvantage of these prior couplings is that such two-stage valves have employed a single spring which acts sequentially and in common on both the pressurizing valve and the main pressure-lock valve, engaging one of the valve bodies to abut and bias against the other. Therefore, there can be no modulation or adjustment of the action of one stage of the valve independently of, or without affecting the action of the other stage of the valve, thereby either limiting the rate of pressurization through that stage of the valve or limiting the biasing action to the pressure lock stage.

The prior couplings for pressure conduits have not been found to be entirely satisfactory.

SUMMARY OF THE INVENTION

In general, the preferred form of the present invention comprises a coupling for pressure conduits one of which is telescoped within the other and each having a main valve positioned to be engaged and opened by the other member when they are coupled, a separate pressure-transferring valve opening across one of the main valves, and an actuator on the other main valve positioned to engage and open the pressure transferring valve after the coupling members are in telescoped relationship and immediately before the main valves are engaged by the opening members.

The pressure transferring valve is coaxial with the main valve of the coupling member in which it is mounted and includes a ball member biased against a conical valve seat by a separate spring positioned to abut the main valve and the ball at the opposite ends thereof.

It is an object of the present invention to provide a simple and reliable coupling for pressure conduits which will minimize the force required to join the coupling when one of the conduits is under pressure.

It is a further object of the present invention to provide a simple and reliable coupling for pressure conduits which requires a minimum of special components and fabrication costs.

It is another object of the present invention to provide a simple and reliable coupling for pressure conduits which includes a pressure-transferring valve in a main pressure-lock valve and which may be separately adjusted to function under desired conditions.

It is still a further object of the present invention to provide a simple and reliable coupling for pressure conduits having a pressure transferring valving system which is operable without imposing limitations on the speed of joining of the coupling members.

A further object of the present invention is the provision of a simple and reliable coupling for pressure conduits including a ball valve for transferring pressure across a main pressure-lock valve and means for biasing the ball valve separately from the bias imposed on the main valve across which the pressure is transferred.

An additional object of the present invention is the provision of a simple and reliable coupling for pressure conduits which includes a separately-biased ball valve for transferring pressure across a main pressure-lock valve and including a conical valve seat free of sharp edges in the area against which the ball member is biased to preclude scoring or burrs on the valve members.

A still further object of the present invention is the provision of a simple and reliable coupling for pressure conduits which includes a pressure-transfer valve acting across a main pressure-lock valve and in the form of a separately-biased ball member and a conical valve seat and including passages ensuring an adequate pressure-transfer route regardless of the degree of engagement or displacement of the ball member by the abutting member of the opposite main pressure-lock valve with which it is to be coupled.

Another object of the present invention is the provision of a simple and reliable coupling for pressure conduits including a pressure-transfer ball-valve acting across a main pressure-lock valve and biased against a conical valve seat by a spring under adjustable compression between the ball member and an abutment on the main valve across which the pressure is to be transferred.

These and additional objects of the invention and a better understanding thereof may be derived from the following description and accompanying drawings, in which.

DESCRIPTION OF THE PREFERRED EMBODIMENT

Figure 1:
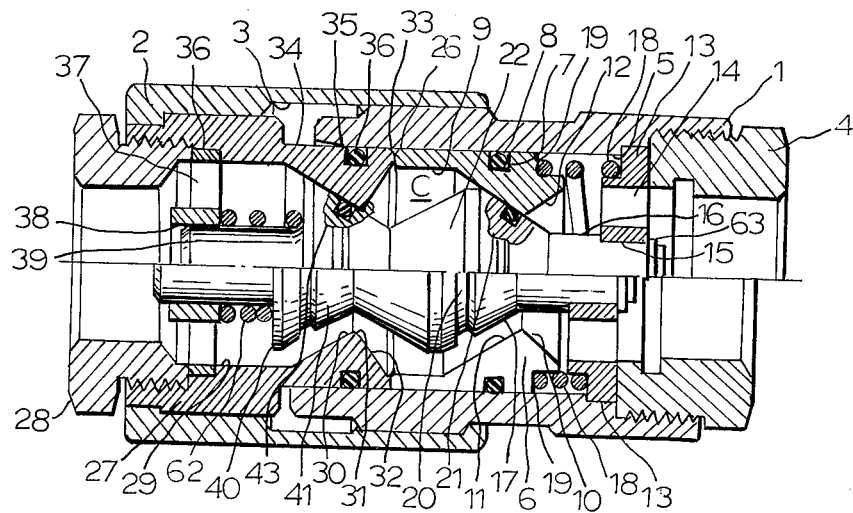
FIG. 1 is a sectional side view of the preferred form of the invention with the upper portion depicting the relationship of the components just prior to final joining, with the lower portion showing the relative positions of the components in the fully-joined position.

As shown in the drawings, the preferred form of the coupling includes right and left coupling members 1 and 2, respectively, as they are shown in FIG. 1. The coupling member 1 is slideably receiveable or telescoped within a bore 3 in the coupling member 2 and carries a suitable hose or conduit fitting 4.

The coupling member 1 has a cylindrical bore 5 therein which receives a valve-seat body 6 in close but slideable relation therein. The seat body 6 has an annular groove 7 in its periphery which mounts an O-ring 8 in fluid-tight, sealing relationship with the bore 5.

The seat body 6 has an axial bore 9 therein which is cylindrical adjacent the outer extremity (its left end, as viewed in FIG. 1) of the body 6 and is conically tapered to a reduced bore 10 to provide a conical valve seat 11, and again tapered outwardly to provide an outwardly enlarging bore 12 adjacent the inner extremity of the seat body 6.

The coupling member 1 carries a mount 13 therein which has apertures 14 for the flow of fluid and has a central socket 15 coaxial with the valve seat 11. The socket 15 rigidly mounts the shank 16 of a conical valve plug 17, which thereby limits the outward or leftward extreme of travel of the seat body 6, as viewed in FIG. 1. A coil spring 18 is positioned in the bore 5 and abuts the mount 13 and a shoulder 19 on the seat body 6, under compression, to bias the seat body 6 and its valve seat 11 to an outward, closed position against the fixed valve plug 17.

The valve plug 17 has an annular groove 20 which carries an O-ring seal 21 for engagement with the valve seat 11. Outward of the seal 21, the plug 17 has a reverse or narrowing conical taper 22 which will be discussed more fully hereinafter. At its outward extremity, the plug 17 terminates in a face 23 which is generally perpendicular to the axis of the bore 5 within which it is mounted.

The face 23 has a recess 24 which mounts a hardened ball 25 centrally of the axis of the bore 5, for a purpose discussed fully hereinafter. The face 23 is generally transversely aligned with the outer extremity 26 of the seat body 6, when the plug 17 is closed against the seat 11.

The coupling member 2 has a seat body 27 rigidly mounted therein by suitable means and, in turn, mounting a hose or conduit fitting 28. The seat body 27 has an axial bore 29 therein which is cylindrical adjacent the conduit fitting 28 and narrows conically to form a valve seat 30 and a reduced bore 31, finally terminating in an outwardly enlarging bore portion 32 adjacent its outward or right-hand extremity 33, as viewed in FIG. 1.

The seat body 27 has a reduced-diameter portion having a cylindrical outer surface 34 which encompasses the portions 30, 31 and 32 or the bore 29 and which is sized for a close but slideable fit within the sleeve or bore 5 of the coupling member 1, when the coupling members are assembled or associated as shown in FIG. 1. The outer surface 34 carries an annular groove 35 for mounting an O-ring 36 to provide a fluid-tight seal with the bore 5.

The coupling member 2 carries a mount 36 secured in the bore 29 and having fluid-flow apertures 37. Centrally, the mount 36 has a socket 38 for slideably mounting the shank 39 of a plug valve 40 having a conical face 41 positionable to engage the conical valve seat 30. The conical face 41 has an annular groove 42 for mounting an O-ring or seal 43 to seal against the valve seat 30.

At its outer extremity, the plug valve 40 terminates in a face 44, generally transversely aligned with the outer extremity 33 when closed and similar to and positioned to meet with the face 23 of the fixed plug valve 17. It is particularly advantageous to the present invention to provide radial passages or grooves on at least one of the faces 23 or 44. As shown in the drawings, and in FIGS. 4 and 5, on an enlarged scale, such radial grooves 45 are provided on the face 23.

As can best be understood with reference to FIGS. 2 through 5, the plug valve 4 has a central, axial transfer bore 46 therein and which is conically tapered inwardly to provide a reduced bore 47 and a valve seat 48. It is preferred that the conical valve seat 48 form an angle of about 120° with the surface of the bore 46, thereby assuring a good seal between the ball 53 and the seat 48. The bore 46 terminates in a conical, outwardly enlarging bore portion 49 opening on the face 44.

At its end remote from the face 44, the bore 46 has a threaded portion 50 for receiving a threaded abutment 51 which abuts a spring 52 which, in turn, is thereby biased, under compression, against a pressure-transmitting or equalizing valve in the form of a hardened ball 53, substantially smaller in diameter than the bore 46 to permit flow therebetween, and which is seatable against the valve seat 48.

Figure 4:
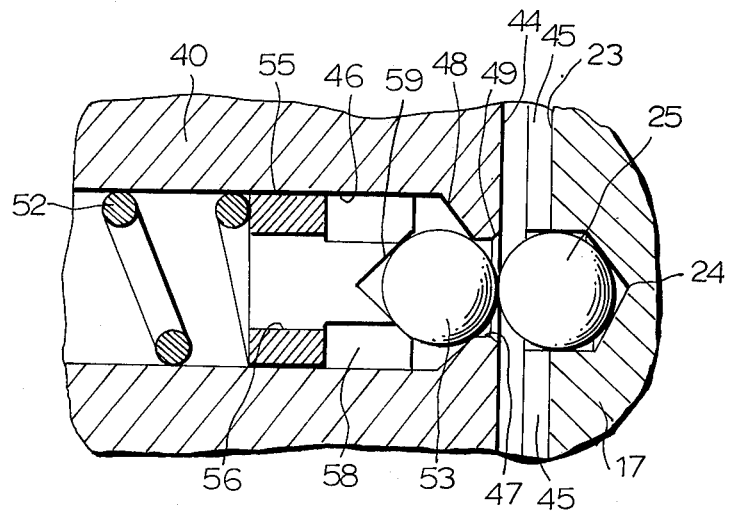
FIG. 4 is an enlarged view of a portion of FIG. 2.
Figure 5:
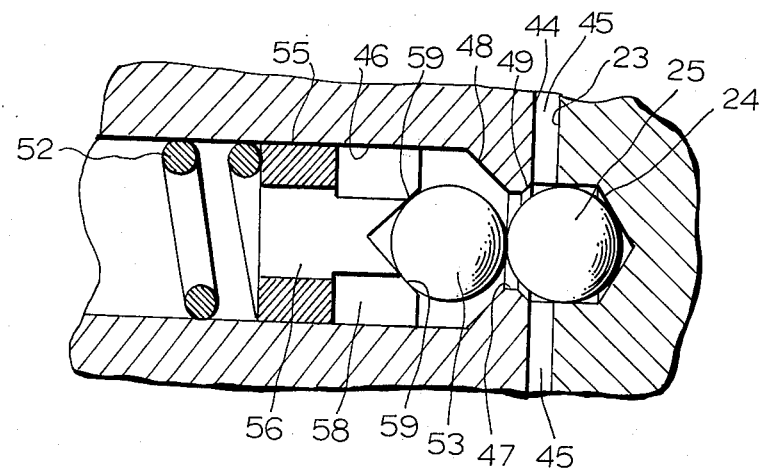
FIG. 5 is an enlarged view of a portion of FIG. 3.

It is of particular advantage to include an apertured follower between the spring 52 and the ball 53. The preferred form of follower is shown in FIGS. 4 and 5 and includes a follower 54 having a cylindrical portion 55 closely fitting but slideable within the bore 46. The follower 54 has an axial bore or aperture 56 therein and a forward extension 57 includes four forwardly extending arms 58 having slanted or tapered surfaces 59 for radially guiding or centering the ball 53.

The threaded abutment 51 is provided with an axial bore 60, to provide fluid communication therethrough, and turning means such as a screwdriver abutment 61. The degree of compression of the spring 52 and its consequent closing bias on the valve ball 53 thus can be adjusted via the axial positioning of the threaded abutment 51.

The plug valve 40 is slideable on its shank 39 in the socket 38, but is biased against the valve seat 30 by a coil spring 62 which is positioned about the valve shank 39 and is under compression between the mount 36 and an abutment or inner face of the plug valve 40.

The plug valve 17, however, is rigidly secured on its mount 13 by suitable means such as by a spring clip or locking member 63 engaging both a groove 64 in the plug valve shank 16 and one side of the mount 13. An abutment 65 on the valve shank 16 engages a side of the mount 13 and prevents motion thereof in the opposite direction.

Therefore, it can be seen that the coupling member 1 includes a fixed plug valve 17 engageable with a moveable valve seat 11, while the coupling member 2 includes a moveable plug valve 40 engageable with a fixed valve seat 30. The moveable plug valve 40, however, carries a pressure equalizing ball valve 53 in communication between the faces of the two plug valves 17 and 40 as they are being finally joined.

The approach and subsequent abutment of the outer end 33 of the seat body 27 with the outer end 26 of the seat body 6 forms an intermediate chamber C which is sealed from the atmosphere by the O-ring seals 8 and 36 on opposite sides of the joint between the seat bodies 6 and 27.

Any suitable locking means, such as a bayonet lock, may be employed to retain the coupling members 1 and 2 in their fully joined position.

OPERATION OF THE PREFERRED EMBODIMENT

In operation of the preferred coupling of the invention, the coupling members are aligned; the reduced-diameter portion 34 is entered into the sleeve formed by the bore 5, and the two coupling members are further pushed axially toward each other.

Figure 2:
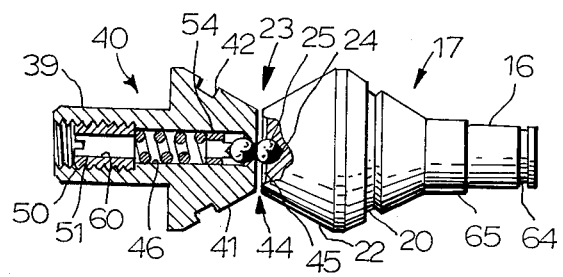
FIG. 2 is a side view, partly in section, of the two main valves of FIG. 1 just prior to final joining.
Figure 3:
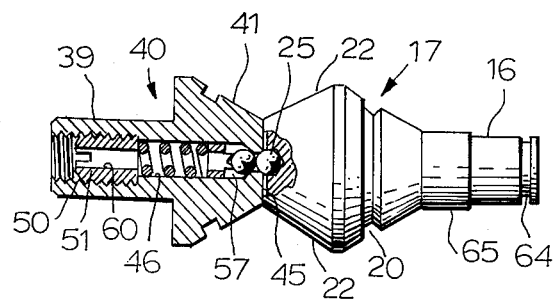
FIG. 3 is a side view similar to FIG. 2 and showing the main valves in their fully joined position.

When the coupling members reach the positions, relative to each other, as shown in the upper half of FIG. 1 and further represented in FIG. 2 and FIG. 4, the ball 25 engages the ball 53 and serves as an opening abutment or member for the ball 53 through the larger, conical bore 49.

Further axial motion thus unseats the ball 53 from the conical seat 44, thereby permitting fluid flow from the interior of the bore 29, and its associated pressure conduit (not shown), sequentially through the bore 60, the bore 46, the bore 56, the radial gaps between the arms 58 and between the tapered surfaces 59, around the ball 55, through the reduced bore 47, the conical bore portion and between the faces 23 and 44 to pressurize the intermediate chamber C. In the event that the coupling members are relatively suddenly joined, the presence of the passageways formed by the radial grooves 45 assures a path for the pressure-transfer flow from the conical bore portion 49 to the surrounding intermediate chamber C, without concern for the speed of assembly of the coupling.

The pressure differential across the valve group 41, 30 is thus removed or at least minimized. At the same time, the pressure in the intermediate chamber C is effective to counteract or diminish any pressure drop across the valve group 17, 11. Therefore, only moderate axial thrust or effort is required to unseat the two valve groups to permit full joining of the coupling members, which is shown in the lower portion of FIG. 1 and represented in FIG. 3 and FIG. 5.

The moveable valve plug 40 is unseated by abutment with its opening member, the fixed valve plug 17, while the moveable valve seat 11 in seat body 6 is unseated from the valve plug 17 by abutment with its respective opening member, the fixed seat body 27, as can best be seen in the lower portion of FIG. 1.

With the conical configuration of the valve plugs 17 and 40 and their associated conical valve seats 30 and 11, respectively, as well as the reverse-conical surface 22 of valve plug 17 and its associated, conical bore portion 32, the coupling provides a large, annular area through which the fluid under pressure can flow from one conduit to another.

Therefore, it is apparent that the present invention provides a particularly advantageous, quick acting coupling for pressure conduits which overcomes the disadvantages of the prior art without increasing the cost of the coupling. In fact, the ready availability of hardened ball bearings occasions in itself a considerable savings over the machining and hardening-treatment of specially designed poppets. Also, the machining and threading of the bore and parts which cooperate with the ball 53, to form the pressure-transfer valve, are simple and straightforward operations of relatively lower expense than is encountered in the more complex designs.

Various changes may be made in the details of the invention, as disclosed, without sacrificing the advantages thereof or departing from the scope of the appended claims.

What is claimed is:
1. A coupling for pressure conduits including
   a. a pair of coupling members, each of said coupling members having
   b. a main valve therein, said main valves each being adapted to be opened by abutment with
   c. an opening member on the opposite valve, a first of said main valves having
   d. an axial transfer bore therethrough,
   e. a pressure-transfer valve within said transfer bore, said pressure transfer valve including within said transfer bore
   f. a ball valve member,
   g. a conical valve seat and
   h. a spring, said spring being adapted to bias said ball against said valve seat,
   i. abutment means on said other main valve for unseating said ball immediately prior to full joining of said coupling,
   j. said main valves each including a face, said faces being adapted to abut each other,
   k. said axial transfer bore terminating in an outwardly tapered bore portion at said face of said first main valve, and
   l. said abutment means including a spherical opening member on the face of the other main valve and aligned with said outwardly tapered bore portion, said spherical opening member being of a size less than that which would obstruct said outwardly tapered bore portion.

2. A coupling as set forth in claim 1 in which one of said main valves has a bore for receiving at least a portion of the other main valve therein, and sealing means for sealing between said bore and said received portion of said other main valve to define a closed chamber, said closed chamber being in communication with said pressure transfer valve.

3. A coupling as set forth in claim 2 including a follower slideably mounted in said transfer bore between said spring and said ball, said follower having an axial bore therethrough and at least one radially opening passageway adjacent said ball.

4. A coupling as set forth in claim 3 in which said follower includes a plurality of arms adapted to engage said ball.

5. A coupling as set forth in claim 4 in which said arms have slanting surfaces engageable with said ball.

6. A coupling as set forth in claim 3 in which said spring is in engagement at its end remote from said ball with an abutment on said first main valve within said transfer bore.

7. A coupling as set forth in claim 6 in which said abutment is longitudinally adjustable relative to said valve seat.

8. A coupling as set forth in claim 7 including threaded means for adjusting said abutment.

9. A coupling as set forth in claim 1 including at least one radial groove on one of said faces, said groove being in communication between said outwardly tapered bore portion and said closed chamber.

* * * * *